UNITED STATES PATENT OFFICE.

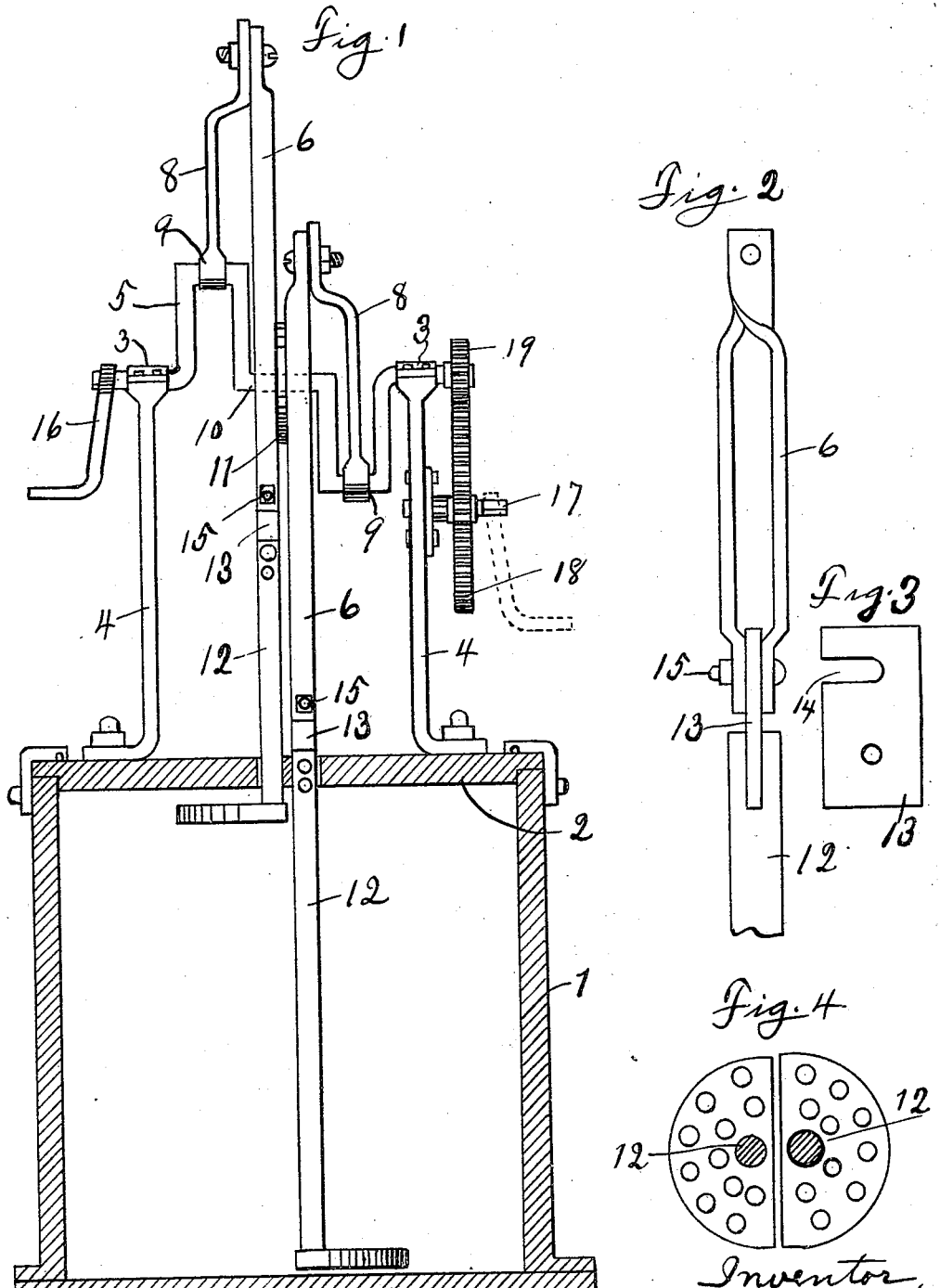

ODE E. MELTON, OF SPANISH FORT, TEXAS.

DOUBLE-DASHER CHURN.

968,675.  Specification of Letters Patent. Patented Aug. 30, 1910.

Application filed November 5, 1909. Serial No. 526,427.

*To all whom it may concern:*

Be it known that I, ODE E. MELTON, a citizen of the United States, residing at Spanish Fort, in the county of Montague and State of Texas, have invented a new and Improved Double-Dasher Churn, of which the following is a specification.

This invention relates to churns and more particularly to double churns and the means for operating the dashers, and the object is to provide churns which are economical and efficient in churning milk and producing butter and by which much time may be saved in churning.

Another object is to provide means for operating the dashers faster or slower as may be desired and to operate the dashers alternately with great rapidity.

Other objects and advantages will be fully explained in the following description and the invention will be more particularly pointed out in the claim.

Reference is had to the accompanying drawings which form a part of this application and specification.

Figure 1 is a front elevation of the operating mechanism with the milk holding vessel shown in vertical section. Fig. 2 is an edge view of one of the guide pitmen, showing the construction and the connection with the dasher stem. Fig. 3 is a side view of a connection between the pitman and the dasher stem or handle. Fig. 4 is a plan view of the dashers.

Similar characters of reference are used to indicate the same parts throughout the several views.

Any suitable vessel 1 may be used to hold the milk to be churned. A cover 2 is attached to the vessel. The operating mechanism is mounted on the cover 2. Supports or uprights 4 are attached to the cover 2 and provided with journals 3 for the crank-shaft 5. The guide pitmen 6 are connected to the driving crank shaft 5 by means of links 8 which are pivotally connected to the guide pitmen 6 and have bearings 9 in which the crank-shaft 5 is journaled. The guide pitmen 6 are made in two parts and may be soldered or brazed together at their upper ends. The guide pitmen straddle the crank-shaft and thus the crank-shaft serves as a guide for the pitmen. The pitmen 6 engage a horizontal portion 10 of the crank-shaft 5 and a washer 11 is placed between the pitmen to prevent friction and to serve as a guide. The pitmen are connected to the dasher handles 12 by plates 13 and the plates 13 have grooves 14 therein for engaging pivot bolts 15 loosely so that the connections are readily detachable.

The dasher may be driven by a crank 16 and the speed may be varied by changing the crank 16 from the crank shaft to the shaft 17 of a cog wheel 18 which will drive a pinion 19 which will drive the crank shaft. It will be apparent that the dasher handles will be maintained in a vertical position by the horizontal portion of the crank-shaft. The alternate raising and depression of the two dashers will thoroughly agitate the milk in the churn and keep the same agitated.

Having fully described my invention, what I claim as new and desire to secure by Letters Patent, is,—

A churn having a perforated top, two dashers in said churn, handles for said dashers projecting through the perforations in said top, a crank-shaft, upright bearings attached to said top and engaging said crank-shaft, said crank-shaft having crank portions extending in diametrically opposite directions from the body portion thereof, and a horizontal portion between said crank portions, slotted pitman rods, notched plates attached to said dasher handles and engaging said pitman rods, links pivotally connected to said pitman rods and engaging the crank portions of said crank-shaft, said pitman rods receiving the horizontal portion of said crank shaft in the slots thereof whereby said pitman rods and dasher handles are maintained in vertical positions, a guiding washer separating said pitman rods and means for driving said crank-shaft.

In testimony whereof, I set my hand in the presence of two witnesses, this 22nd day of October, 1909.

ODE E. MELTON.

Witnesses:
R. E. DAMRON,
A. L. JACKSON.